Nov. 14, 1939.    R. W. VOTE    2,180,077

FRUIT PICKING DEVICE

Filed Sept. 20, 1938

Inventor

Rex W. Vote,

By Clarence A. O'Brien
and Hyman Berman
Attorneys

Patented Nov. 14, 1939

2,180,077

UNITED STATES PATENT OFFICE 2,180,077

FRUIT PICKING DEVICE

Rex W. Vote, Thermal, Calif., assignor of one-third to A. F. La Fonde and one-third to Leo F. Falder, both of Los Angeles, Calif.

Application September 20, 1938, Serial No. 230,853

1 Claim. (Cl. 56—339)

This invention relates to fruit picking devices or baskets, and has for the primary object the provision of a device of this character which may be readily applied to the end of a handle of a selected length so that the device may be employed from a standing position on the ground to remove fruit from a tree without damaging the fruit or the branches of the tree and which is so constructed as to be durable, compact to permit easy handling thereof and may be manufactured and sold at a low cost.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a fruit picking device constructed in accordance with my invention.

Figure 1:
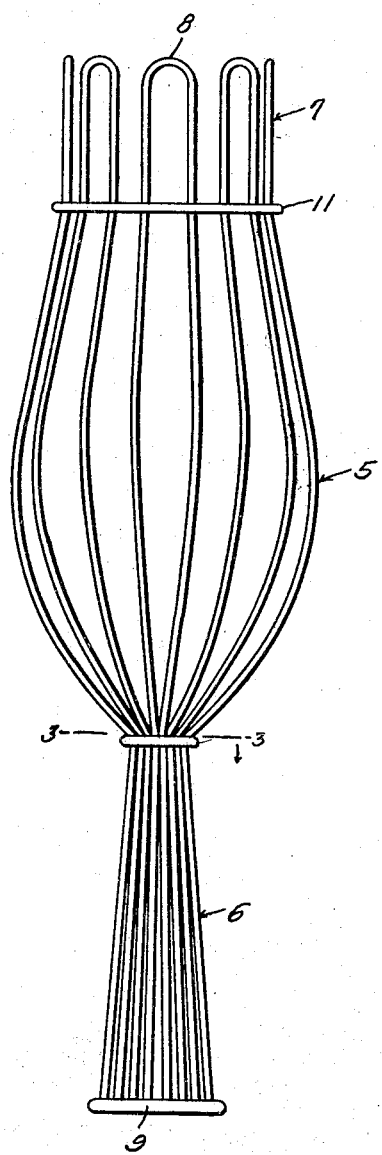
Figure 2:
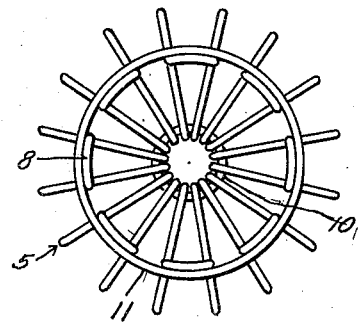
Figure 2 is an end view illustrating the device.
Figure 3:
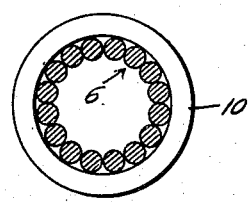
Figure 3 is a sectional view taken on line 3—3 of Figure 1.

Referring in detail to the drawing, the numeral 5 indicates a basket portion, 6 a handle receiving ferrule and 7 a mouth portion for the basket portion. The basket portion is of the largest diameter at substantially intermediate its ends and gradually reduces in diameter towards opposite ends thereof so that the basket portion will have a comparatively restricted bottom and a taper towards the mouth portion 7. The mouth portion as well as the basket 5 and ferrule 6 are constructed from a series of metallic cylindrical members which are first bent upon themselves to form relatively spaced fingers 8 which go to make up the mouth portion 7. The metallic members are then curved to form the basket portion 5 and then bent in close relation to form the ferrule 6 which tapers towards the base of the basket portion. The ends of the metallic members are formed on a ring 9 located at the handle receiving end of the ferrule. A ring 10 is mounted on the metallic members for retaining them in close relation at the opposite end of the ferrule or where the latter forms onto the basket portion. A larger ring 11 surrounds the metallic members where the basket portion merges into the mouth portion. The securing of the rings 9, 10 and 11 on the metallic members can be accomplished in any well known manner. The fingers 8 which define the mouth portion 7 will permit the stems or branches of a tree to readily pass therebetween and with the fruit positioned directly over the mouth portion 7 a slight lateral push or twist of the device will bring about removal of the fruit from the stem or branch and the deposit thereof in the basket portion 5. Due to the particular shape of the basket portion 5 the fruit will gravitate gradually therein without danger of bruising or mashing. To remove the fruit from the basket portion it is only necessary to invert the device.

It is to be understood that a handle of any selected length is inserted at one end into the ferrule 6, the latter being constructed of a series of metallic members will readily grip the end of the handle and retain the latter therein against accidental displacement.

The ring 11 being located between the mouth portion 7 and the basket portion limits the movement of the stem between the fingers and aids in dislodging the fruit therefrom for gravitation into the basket portion.

The device constructed in accordance with the showing made in the drawings and with the detail description is capable of easy handling by the operator to permit picking of fruit to be carried out with comparative ease and without danger of damaging the fruit or the branches of the tree. Further, the construction of this device is such that it is compact, durable and may be easily constructed to reduce the cost of manufacture.

It is believed that the foregoing description, when taken in connection with the drawing, will fully set forth the construction and advantages of this invention to those skilled in the art to which such a device relates, so that further detailed description will not be required.

What is claimed is:

A fruit picker comprising a substantially barrel-shaped basket having a cylindrical mouth, a closed bottom, an outwardly flaring ferrule extending axially from said bottom, and a bulging body portion intermediate said mouth and bottom, said basket and ferrule being formed of a plurality of elongated wire elements grouped lengthwise together in circular formation about a common axis and bent upon themselves to provide connected pairs of spaced parallel stretches forming said mouth, pairs of bowed stretches forming said body portion and bottom, and pairs of divergent stretches forming said ferrule, and a plurality of rings connecting said elements together in circular formation, one at the inner end of said mouth and a pair at the outer and inner ends of said ferrule, respectively.

REX W. VOTE.